US012702932B2

(12) United States Patent
Hu

(10) Patent No.: US 12,702,932 B2
(45) Date of Patent: Aug. 11, 2026

(54) INTERACTION CONTROLLING METHOD, APPARATUS, ELECTRONIC DEVICE AND STORAGE MEDIUM

(71) Applicant: Beijing Zitiao Network Technology Co., Ltd., Beijing (CN)

(72) Inventor: Songtao Hu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 418 days.

(21) Appl. No.: 18/572,694

(22) PCT Filed: Oct. 18, 2022

(86) PCT No.: PCT/CN2022/125961
§ 371 (c)(1),
(2) Date: Dec. 20, 2023

(87) PCT Pub. No.: WO2023/071871
PCT Pub. Date: May 4, 2023

(65) Prior Publication Data
US 2024/0286046 A1 Aug. 29, 2024

(30) Foreign Application Priority Data
Nov. 1, 2021 (CN) ......................... 202111285220.X

(51) Int. Cl.
*A63F 13/833* (2014.01)

(52) U.S. Cl.
CPC ................................. *A63F 13/833* (2014.09)

(58) Field of Classification Search
CPC .... A63F 13/833; A63F 13/2145; A63F 13/42; A63F 13/44; A63F 13/533; A63F 13/537; A63F 13/58; A63F 13/52; A63F 2300/308
See application file for complete search history.

(56) References Cited

U.S. PATENT DOCUMENTS 11,007,439 B1 5/2021 Pineda
2006/0287088 A1 12/2006 Mashimo et al.
(Continued)

FOREIGN PATENT DOCUMENTS

CN 110538452 A 12/2019
CN 111760274 A 10/2020
(Continued)

OTHER PUBLICATIONS

European Patent Office, Extended European Search Report for European Application No. 22885749.6, mailed Oct. 9, 2024, 13 pages.

(Continued)

*Primary Examiner* — Thomas H Henry
(74) *Attorney, Agent, or Firm* — Alleman Hall LLP

(57) ABSTRACT

The present disclosure provides an interaction controlling method, apparatus, electronic device, storage medium, computer program product and computer program. The method is applied to a terminal device, the method comprising: in response to a first trigger operation on the first button, releasing a sub-skill corresponding to the first trigger operation, and triggering a display of a second target numerical value; in response to a second trigger operation being detected, updating the second target numerical value based on the second trigger operation, the second trigger operation being used for triggering a second button, the second button being a button different from the first button in the plurality of buttons; in the case that the second target numerical value meets a preset condition, updating the first target numerical value.

20 Claims, 3 Drawing Sheets

S101: In response to a first trigger operation on the first button, release a sub-skill corresponding to the first trigger operation, and trigger a display of a second target numerical value S102: In response to a second trigger operation being detected, update the second target numerical value based on the second trigger operation, the second trigger operation being used for triggering a second button, the second button being a button different from the first button in a plurality of buttons S103: In response to the second target numerical value meeting a preset condition, update the first target numerical value

(56) References Cited

U.S. PATENT DOCUMENTS

2019/0099674 A1* 4/2019 Yu ........................... A63F 13/58
2019/0265867 A1 8/2019 Kodisoja et al.
2020/0391111 A1* 12/2020 Yu ......................... A63F 13/537

FOREIGN PATENT DOCUMENTS

CN 112619145 A 4/2021
CN 113893527 A 1/2022
JP 2017099843 A 6/2017

OTHER PUBLICATIONS

European Patent Office, Communication pursuant to Rules 70(2) and 70a(2) EPC for European Application No. 22885749.6, mailed Oct. 29, 2024, 1 page.
ISA China National Intellectual Property Administration, International Search Report and Written Opinion Issued in Application No. PCT/CN2022/125961, Dec. 27, 2022, WIPO, 10 pages.

* cited by examiner

INTERACTION CONTROLLING METHOD, APPARATUS, ELECTRONIC DEVICE AND STORAGE MEDIUM

CROSS-REFERENCE TO RELATED APPLICATION(S)

This application is a national stage application filed under 35 U.S.C. 371 based on International Patent Application No. PCT/CN2022/125961, filed on Oct. 18, 2022, which claims priority to Chinese Application No. 202111285220.X entitled "Interaction Controlling Method, Apparatus, Electronic Device and Storage Medium" filed on Nov. 1, 2021. The full disclosures of these applications are incorporated in the present application by reference.

FIELD

The present disclosure relates to the technical field of gaming, and in particular, to an interaction controlling method, apparatus, electronic device, storage medium, computer program product and computer program.

BACKGROUND

In many types of games, controls are configured to controlling virtual objects to release skills in games; players may release skills by triggering these controls. Some skills will enter a cool down time of the skills after being released; during the cool down time, players can no longer trigger the release of these skills until the cool down time ends. This method of skill release has a problem of poor diversity.

SUMMARY

Embodiments of the present disclosure at least provide an interaction controlling method and apparatus, an electronic device, a storage medium, a computer program product and a computer program.

In a first aspect, an embodiment of the present disclosure provides an interaction controlling method, applied to a terminal device; a game operating interface is displayed in the terminal device; at least one virtual object and a plurality of buttons are presented in the game operating interface; the at least one virtual object comprises a first virtual object, and the plurality of buttons comprises a first button, the first button being used for triggering the first virtual object to release a target skill, the target skill comprising a plurality of sub-skills, wherein the plurality of sub-skills of the target skill being sequentially released by continuously triggering the first button; the target skill is associated with a first target numerical value, the first target numerical value characterizing a duration that after a final sub-skill of the plurality of sub-skills is released and in the case of the first button being triggered, the target skill is not released to respond; the method comprises:

in response to a first trigger operation on the first button, releasing a sub-skill corresponding to the first trigger operation, and triggering a display of a second target numerical value;

in response to a second trigger operation being detected, updating the second target numerical value based on the second trigger operation, the second trigger operation being used for triggering a second button, the second button being a button different from the first button in the plurality of buttons;

in the case that the second target numerical value meets a preset condition, updating the first target numerical value.

In a possible implementation, wherein in response to the first trigger operation on the first button, releasing the sub-skill corresponding to the first trigger operation and triggering the display of the second target numerical value comprises: in response to the first trigger operation on the first button, in the case of the sub-skill corresponding to the first trigger operation is a non-final sub-skill in the plurality of sub-skills, releasing the non-final sub-skill and triggering the display of the second target numerical value; in the case that the sub-skill corresponding to the first trigger operation is the final sub-skill in the plurality of sub-skills, releasing the final sub-skill, and controlling the first button to enter an invalid state based on the first target numerical value, wherein the target skill is not released to respond in the case of the first button being in the invalid state.

In a possible implementation, after the releasing the final sub-skill, the method further comprises: resetting the first target numerical value to a first preset numerical value.

In a possible implementation, wherein in response to the first trigger operation on the first button, in the case that the sub-skill corresponding to the first trigger operation is the non-final sub-skill in the plurality of sub-skills, releasing the non-final sub-skill and triggering the display of the second target numerical value comprises: in response to the first trigger operation on the first button, in the case that the sub-skill corresponding to the first trigger operation is the non-final sub-skill in the plurality of sub-skills, releasing the non-final sub-skill; and detecting whether a current first target numerical value is a second preset numerical value; in the case that the current first target numerical value is not the second preset numerical value, triggering the display of the second target numerical value.

In a possible implementation, wherein in the case that the second target numerical value meets the preset condition, updating the first target numerical value comprises: in the case that the second target numerical value meets the preset condition, updating the first target numerical value to the second preset numerical value; or in the case that the second target numerical value meets the preset condition, updating the first target numerical value based on a first numerical value corresponding to the second trigger operation.

In a possible implementation, wherein triggering the display of the second target numerical value comprises: presenting a numerical value display control corresponding to the second target numerical value at a preset position of the game operating interface, the numerical value display control comprising a first end, a second end, and a dynamic identifier located between the first end and the second end.

In a possible implementation, wherein after in response to the second trigger operation being detected, updating the second target numerical value based on the second trigger operation, the method further comprises: adjusting a position of the dynamic identifier between the first end and the second end based on the updated second target numerical value.

In a possible implementation, wherein in response to the second trigger operation being detected, updating the second target numerical value based on the second trigger operation comprises: determining a second numerical value corresponding to the second button based on the second button triggered by the second trigger operation; updating the second target numerical value based on the second numerical value corresponding to the second button.

In a possible implementation, wherein in response the second trigger operation being detected, updating the second target numerical value based on the second trigger operation comprises: in response to the second trigger operation on the second button being detected, releasing a skill corresponding to the second trigger operation, wherein the skill is different from the target skill; in response to the skill hitting a second virtual object, updating the second target numerical value based on the second trigger operation.

In a possible implementation, wherein the preset condition comprises at least one of: the second target numerical value reaching a first preset numerical value threshold; a percentage between the second target numerical value and a second preset numerical value threshold reaching a preset percentage; the second target numerical value reaching the first preset numerical value threshold within a preset duration after the first trigger operation; a percentage between the second target numerical value and the second preset numerical value threshold reaching a preset percentage within a preset duration after the first trigger operation.

In a possible implementation, wherein after updating the first target numerical value, the method further comprises: recording a number of times that a duration of the first button being in an invalid state is less than a preset numerical value after the final sub-skill is continuously released; determining a preset duration corresponding to the next release cycle of the target skill based on the number of times.

In a possible implementation, wherein the method further comprises: in response to the second target numerical value not meeting the preset condition and a third trigger operation on the first button being detected, resetting the second target numerical value to a third preset value.

In a possible implementation, the method further comprises: in response to a sub-skill corresponding to the third trigger operation being a non-final sub-skill in the plurality of sub-skills, releasing the sub-skill corresponding to the third trigger operation, and triggering a display of the reset second target numerical value; in response to the sub-skill corresponding to the third trigger operation being a final sub-skill in the plurality of sub-skills, releasing the sub-skill corresponding to the third trigger operation, and controlling the first button to enter an invalid state based on the first target numerical value.

In a second aspect, the embodiments of the present disclosure further provide an interaction controlling apparatus, applied to a terminal device; wherein a game operating interface is displayed in the terminal device; at least one virtual object and a plurality of buttons are presented in the game operating interface; the at least one virtual object comprises a first virtual object, and the plurality of buttons comprises a first button, the first button being used for triggering the first virtual object to release a target skill, the target skill comprising a plurality of sub-skills, wherein the plurality of sub-skills of the target skill being sequentially released by continuously triggering the first button; the target skill is associated with a first target numerical value, the first target numerical value characterizing a duration that after a final sub-skill of the plurality of sub-skills is released and in the case of the first button being triggered, the target skill is not released to respond; the apparatus comprises: a first responding module, configured to in response to a first trigger operation on the first button, release a sub-skill corresponding to the first trigger operation, and trigger a display of a second target numerical value; a second responding module, configured to in response to a second trigger operation being detected, update the second target numerical value based on the second trigger operation, the second trigger operation being used for triggering a second button, the second button being a button different from the first button in the plurality of buttons; an updating module, configured to in the case that the second target numerical value meets a preset condition, update the first target numerical value.

In a possible implementation, when, in response to the first trigger operation on the first button, release the sub-skill corresponding to the first trigger operation and triggering the display of the second target numerical value, the first responding module is configured to: in response to the first trigger operation on the first button, in the case of the sub-skill corresponding to the first trigger operation is a non-final sub-skill in the plurality of sub-skills, release the non-final sub-skill and triggering the display of the second target numerical value; in the case that the sub-skill corresponding to the first trigger operation is the final sub-skill in the plurality of sub-skills, release the final sub-skill, and control the first button to enter an invalid state based on the first target numerical value, wherein the target skill is not released to respond in the case of the first button being in the invalid state.

In a possible implementation, after releasing the final sub-skill, the first responding module is further configured to: reset the first target numerical value to a first preset numerical value.

In a possible implementation, when, in response to the first trigger operation on the first button, in the case that the sub-skill corresponding to the first trigger operation is the non-final sub-skill in the plurality of sub-skills, releasing the non-final sub-skill and triggering the display of the second target numerical value, the first responding module is configured to: in response to the first trigger operation on the first button, in the case that the sub-skill corresponding to the first trigger operation is the non-final sub-skill in the plurality of sub-skills, release the non-final sub-skill; and detect whether a current first target numerical value is a second preset numerical value; in the case that the current first target numerical value is not the second preset numerical value, trigger the display of the second target numerical value.

In a possible implementation, when in the case that the second target numerical value meets the preset condition, updating the first target numerical value, the updating module is configured to: in the case that the second target numerical value meets the preset condition, update the first target numerical value to the second preset numerical value; or in the case that the second target numerical value meets the preset condition, update the first target numerical value based on a first numerical value corresponding to the second trigger operation.

In a possible implementation, when triggering the display of the second target numerical value, the first responding module is configured to: present a numerical value display control corresponding to the second target numerical value at a preset position of the game operating interface, the numerical value display control comprising a first end, a second end, and a dynamic identifier located between the first end and the second end.

In a possible implementation, after in response to the second trigger operation being detected, updating the second target numerical value based on the second trigger operation, the first responding module is further configured to: adjust a position of the dynamic identifier between the first end and the second end based on the updated second target numerical value.

In a possible implementation, when, in response to the second trigger operation being detected, updating the second target numerical value based on the second trigger operation, the second responding module is configured to: determine a second numerical value corresponding to the second button based on the second button triggered by the second trigger operation; update the second target numerical value based on the second numerical value corresponding to the second button.

In a possible implementation, when, in response the second trigger operation being detected, updating the second target numerical value based on the second trigger operation, the second responding module is configured to: in response to the second trigger operation on the second button being detected, release a skill corresponding to the second trigger operation, wherein the skill is different from the target skill; in response to the skill hitting a second virtual object, update the second target numerical value based on the second trigger operation.

In a possible implementation, the preset condition comprises at least one of the following: the second target numerical value reaching a first preset numerical value threshold; a percentage between the second target numerical value and a second preset numerical value threshold reaching a preset percentage; the second target numerical value reaching the first preset numerical value threshold within a preset duration after the first trigger operation; a percentage between the second target numerical value and the second preset numerical value threshold reaching a preset percentage within a preset duration after the first trigger operation.

In a possible implementation, after updating the first target numerical value, the updating module is further configured to: record a number of times that a duration of the first button being in an invalid state is less than a preset numerical value after the final sub-skill is continuously released; determine a preset duration corresponding to the next release cycle of the target skill based on the number of times.

In a possible implementation, the second responding module is further configured to: in response to the second target numerical value not meeting the preset condition and a third trigger operation on the first button being detected, reset the second target numerical value to a third preset value.

In a possible implementation, the first responding module is further configured to: in response to a sub-skill corresponding to the third trigger operation being a non-final sub-skill in the plurality of sub-skills, release the sub-skill corresponding to the third trigger operation, and triggering a display of the reset second target numerical value; in response to the sub-skill corresponding to the third trigger operation being a final sub-skill in the plurality of sub-skills, release the sub-skill corresponding to the third trigger operation, and controlling the first button to enter an invalid state based on the first target numerical value.

In a third aspect, the embodiments of the present disclosure further provide an electronic device comprising: a processor, a memory and a bus, the memory storing machine-readable instructions executable by the processor, when the electronic device runs, the processor and the memory communicating via the bus, the machine-readable instructions, when executed by the processor, performing the steps in the first aspect or in any possible implementation of the first aspect.

In a fourth aspect, the embodiments of the present disclosure further provide a computer-readable storage medium, wherein a computer program is stored on the computer-readable storage medium, the computer program, when executed by a processor, performing the steps in the first aspect or in any possible implementation of the first aspect.

In a fifth aspect, the embodiments of the present disclosure further provide a computer program product, which carries program codes, instructions included in the program codes, when executed by a processor, performing the steps in the first aspect or in any possible implementation of the first aspect.

In a sixth aspect, the embodiments of the present disclosure further provide a computer program, which, when executed by a processor, performs the steps in the first aspect or in any possible implementation of the first aspect.

In the interaction controlling method provided by the embodiments of the present disclosure, the game operating interface comprises a first button for releasing a target skill; the target skill comprises a plurality of sub-skills; in response to a first trigger operation on the first button, a sub-skill corresponding to the first trigger operation is released, and the display of a second target numerical value is triggered; in response to a second trigger operation being detected, the second target numerical value is updated based on the second trigger operation, and in the case that the second target numerical value meets a preset condition, a first target numerical value is updated, the first target numerical value being used for characterizing a duration that after a final sub-skill of the plurality of sub-skills in the target skill is released and in the case of the first button being triggered, the target skill is not released to respond. By configuring the target skill that comprises a plurality of sub-skills and configuring the special update mechanism for the cool down time of the target skill, the diversity of the release of game skills is improved.

To make the above objects, features and advantages of the present disclosure more apparent and understandable, a detailed illustration is presented below by way of preferred embodiments in cooperation with the accompanying drawings.

BRIEF DESCRIPTION OF THE DRAWINGS

In order to more clearly illustrate the technical solution of the embodiments of the present disclosure, a brief introduction is presented below to the accompanying drawings used herein, which are incorporated into the specification to form a portion of the specification. These drawings show embodiments that conform to the present disclosure and are used to illustrate the technical solution of the present disclosure together with the specification. It should be understood that the accompanying drawings below merely show some embodiments of the present disclosure and should not be construed as limiting the scope. According to the accompanying drawings, those of ordinary skill in the art may further obtain other relevant drawings without the exercise of any inventive skill.

DETAILED DESCRIPTION OF EMBODIMENTS

Figure 1:
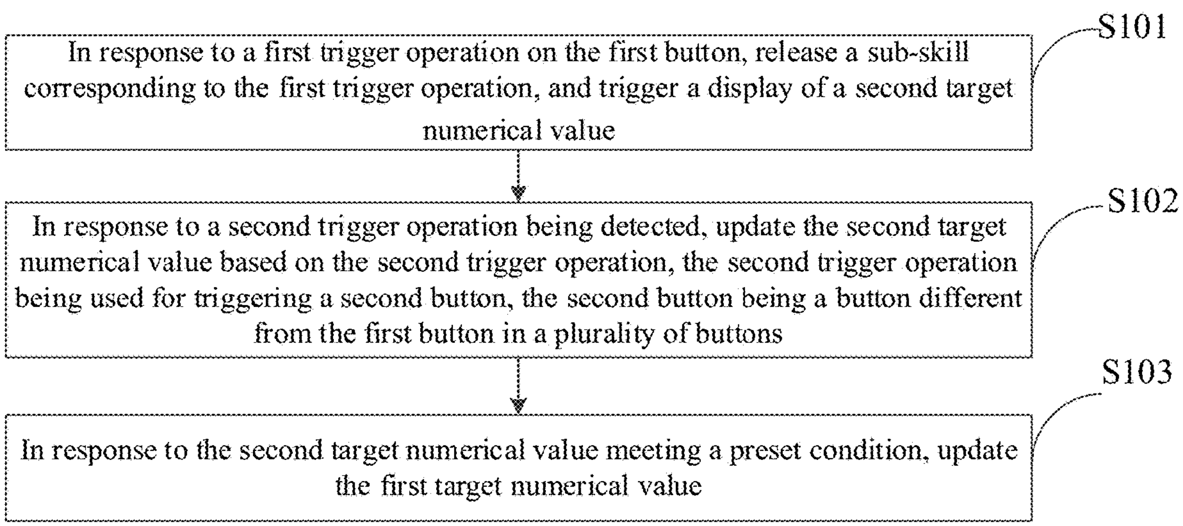
FIG. 1 shows a flowchart of an interaction controlling method provided by an embodiment of the present disclosure.

In order to make the objectives, technical solution and advantages of the embodiments of the present disclosure clearer, the technical solution provided in the embodiments of the present disclosure will be clearly and completely described in conjunction with the accompanying drawings. Apparently, the embodiments to be described are merely a portion rather than all of the embodiments of the present disclosure. Usually, components of the embodiments of the present disclosure described and illustrated herein may be arranged and designed in various configurations. Therefore, the following detailed description of the embodiments of the present disclosure is not intended to limit the protection scope of the present disclosure but merely represents selected embodiments of the present disclosure. Based on the embodiments of the present disclosure, all other embodiments obtained by those skilled in the art without the exercise of any inventive skill fall under the protection scope of the present disclosure.

Studies suggest that skills configured to virtual objects in a game usually only have a fixed cool down time; that is, when a control corresponding to a certain skill is triggered, the virtual object releases the corresponding skill, and at the same time, the control of the skill is set to a cool down state; in the cool down state, the skill cannot be released. With the rapid development of mobile phone games (mobile games), due to the operation mode and the limitation of the screen size of cell phones and other terminal devices, handheld games can only be configured with a limited number of controls to trigger skills, which leads to a limited number of skills for virtual objects and greatly reduces the diversity of skill releases.

Based on the foregoing studies, the present disclosure provides an interaction controlling method. By configuring in a game a target skill that comprises a plurality of sub-skills and configuring a first button for triggering the target skill, a player may release different sub-skills in the target skill through a plurality of first trigger operations on a first button; while releasing a corresponding sub-skill after the first button is triggered through the first trigger operation, the display of a second target numerical value is triggered; the player may update the second target numerical value through a second trigger operation; after the second target numerical value meets a preset condition, a first numerical value characterizing a cool down time of the target skill is updated. In this way, the cool down of the target skill may be dynamically adjusted, and further the player is provided with more operation modes while releasing skills, which improves the diversity of skill release.

The drawbacks that exist in the above solutions result from practice and careful study of the inventor. Therefore, the discovery process of the above problems and solutions proposed by the present disclosure below for the above problems should fall within the inventor's contribution to the present disclosure in the course of the present disclosure.

The technical solution provided in the embodiments of the present disclosure will be clearly and completely described in conjunction with the accompanying drawings. Apparently, the embodiments to be described are merely a portion rather than all of the embodiments of the present disclosure. Usually, components of the embodiments of the present disclosure described and illustrated herein may be arranged and designed in various configurations. Therefore, the following detailed description of the embodiments of the present disclosure is not intended to limit the protection scope of the present disclosure but merely represents selected embodiments of the present disclosure. Based on the embodiments of the present disclosure, all other embodiments obtained by those skilled in the art without the exercise of any inventive skill fall under the protection scope of the present disclosure.

It is noteworthy that similar numerals and letters represent similar items in the following drawings, so that once an item is defined in an accompanying drawing, it does not need to be further defined and explained in subsequent accompanying drawings.

For the sake of the understanding of this embodiment, first of all, a detailed description is presented to an interaction controlling method disclosed by the embodiments of the present disclosure. The execution body of the interaction controlling method disclosed herein is generally an electronic device with certain computing power, the electronic device including, for example, a terminal device or a server or other processing device. The terminal device may be user equipment (UE), a mobile device, a user terminal, a terminal, a cellular phone, a cordless phone, a personal digital assistant (PDA), a handheld device, a computing device, an on-board device, a wearable device, etc. In the terminal device, In the terminal device, there are installed game programs corresponding to games. It is noteworthy that games may also run in a server, relevant data processing is performed with the server, and the terminal device, as a display device, displays data sent by the server. When the game program runs in the terminal device, a game scene of a game comprises virtual objects, and a game operating interface of the game is presented via a graphical user interface of a display component, the game operating interface partly including the game scene. Wherein virtual objects may be displayed in the game operating interface. For example, in a third-person game, virtual objects may be displayed in the game operating interface; virtual objects may also not be displayed in the game operating interface, for example, in a first-person game, virtual objects are not displayed in the game operating interface.

In some possible implementations, the interaction controlling method may be performed by a processor in an electronic device invoking computer-readable instructions stored in a memory.

The interaction controlling method provided by the embodiments of the present disclosure will be illustrated below in the context where the execution body is a terminal device. In the terminal device, a game operating interface is displayed. At least one virtual object and a plurality of buttons are presented in the game operating interface. The at least one virtual object includes a first virtual object, and the plurality of buttons include a first button, which is used for triggering the first virtual object to release a target skill. The target skill includes a plurality of sub-skills, wherein by continuously triggering the first button, the plurality of sub-skills of the target skill can be sequentially released. The target skill is associated with a first target numerical value, characterizing a duration that after a final sub-skill of the plurality of sub-skills is released and in the case of the first button being triggered, the target skill is not released to respond. The duration for which the release of the target skill is no longer responded to after the first button is trigger is also referred to as a cool down time (CD) of the target skill.

With reference to FIG. 1, this figure shows a flowchart of an interaction controlling method provided by an embodiment of the present disclosure. The method comprises steps S101~S103, wherein, S101: in response to a first trigger operation on the first button, releasing a sub-skill corresponding to the first trigger operation, and triggering a display of a second target numerical value;

S102: in response to a second trigger operation being detected, updating the second target numerical value based on the second trigger operation, the second trigger operation being used for triggering a second button, the second button being a button different from the first button in the plurality of buttons;

S103: in the case that the second target numerical value meets a preset condition, updating the first target numerical value.

The game operating interface corresponding to the embodiments of the present disclosure comprises a first button for releasing a target skill; the target skill comprises a plurality of sub-skills; in response to a first trigger operation on the first button, a sub-skill corresponding to the first trigger operation is released, and the display of a second target numerical value is triggered; in response to a second trigger operation being detected, the second target numerical value is updated based on the second trigger operation; if the second target numerical value meets a preset condition, a first target numerical value is updated, the first target numerical value being used for characterizing a duration for which the release of the target skill is no longer responded to when the first button is triggered after the last one of the plurality of sub-skills in the target skill is released. By configuring the target skill that comprises a plurality of sub-skills and configuring the special update mechanism for the cool down time of the target skill, the diversity of the release of game skills is improved.

Detailed illustration of S101~S103 is presented below.

Regarding S101, when a player plays a game on a terminal device, the player will manipulate virtual objects in the game by using buttons displayed on a game operating interface. The buttons in the game operating interface may be used for releasing a skill, moving a position, triggering resources located in a game scene (for example, picking up items dropped by non-player characters (NPCs) in the game after their hit points reach zero, or collecting ore, wood and other resources that have been refreshed in the game), using items in a backpack and other operations.

Wherein the plurality of buttons comprise the first button for triggering the target skill.

In the specific implementation, the first trigger operation on the first button includes, for example: a click operation, a drag operation, a long press operation, a re-press operation, or a combination of the above operations on the first button. As an example, suppose the trigger operation on the first button comprises a combination of a click operation and a drag operation. Through the drag operation, the release direction of the skill may be controlled, and one of the plurality of sub-skills may be released; afterwards, through the click operation, subsequent other sub-skills may be released in the same release direction; when the orientation of an attack object changes, the release direction of a next sub-skill may be adjusted through the drag operation.

In addition, regarding the same sub-skill, if the first trigger operation differs, then the effect of triggering skills may also be different. For example, when a sub-skill is a physical attack skill and is triggered by the player through the click operation, the virtual object performs a normal attack on a virtual object of an enemy faction; if the sub-skill is triggered by the player through the long-press operation, the virtual object will enter a charge state and perform a heavy attack on a virtual object of an enemy faction after the charge reaches a certain condition.

After the first button is triggered by the first trigger operation, the terminal device, in response to the first trigger operation, releases a sub-skill corresponding to the first trigger option. Where the first sub-skill of the target skill has not yet been released, the first button is triggered by the first trigger operation for N consecutive times to release N sub-skills of the target skill in sequence.

As an example, where the first trigger operation is the click operation, the target skill comprises N sub-skills. Regarding different types of target skills, sub-skills may also differ. As an example, the target skill is a physical attack skill, and the N sub-skills are N sub-actions in a set of physical attack moves, each of which may inflict a certain damage value on a virtual object of the enemy faction; wherein, when each sub-skill is released, the virtual object performs consecutive attack actions, and the attack actions may last for a certain duration. The N sub-skills may be connected to each other in in terms of action, i.e., when the virtual object releases different sub-skills, the actions corresponding to the different sub-skills have coherence; also there may be no action coherence, i.e., when the virtual object releases different sub-skills, the actions corresponding to the different sub-skills have no coherence. For another example, the target skill is a magic attack skill, the N sub-skills are N sub-actions during the magic process, and the N sub-actions may trigger different magic attack effects.

As an example, after the first button is triggered through the first trigger operation, either A or B might exist:

A: in the case that the sub-skill corresponding to the first trigger operation is a non-final sub-skill of the plurality of sub-skills, the non-final sub-skill is released, and the display of the second target numerical value is triggered.

As an example, the second target numerical value may be used for characterizing an energy value accumulated by the player through the second trigger operation after the release of the non-final sub-skill. In response to the accumulation of the energy value meeting a preset condition, a first target numerical value may be updated. Since the first target numerical value characterizes a cool down time needed by the target skill after the release of the final sub-skill in the target skill is completed, after the non-final sub-skill is triggered through the first trigger operation, the cool down time of the target skill after completion of the release may be updated through the second trigger operation.

To enable the player to have a clear understanding of the skill release state of the game, the second target numerical value may be, for example, presented in the form of a number or a numerical value display control in the game operating interface. As an example, when the second target numerical value is presented in the form of a number, the second target numerical value may be presented at a preset position of the game operating interface, the second target numerical value may be a percentage value, such as "50%," "75%," etc., or may be a number value, such as "45," "90," etc., wherein the percentage is a percentage between the second target value and a preset value.

Figure 2:
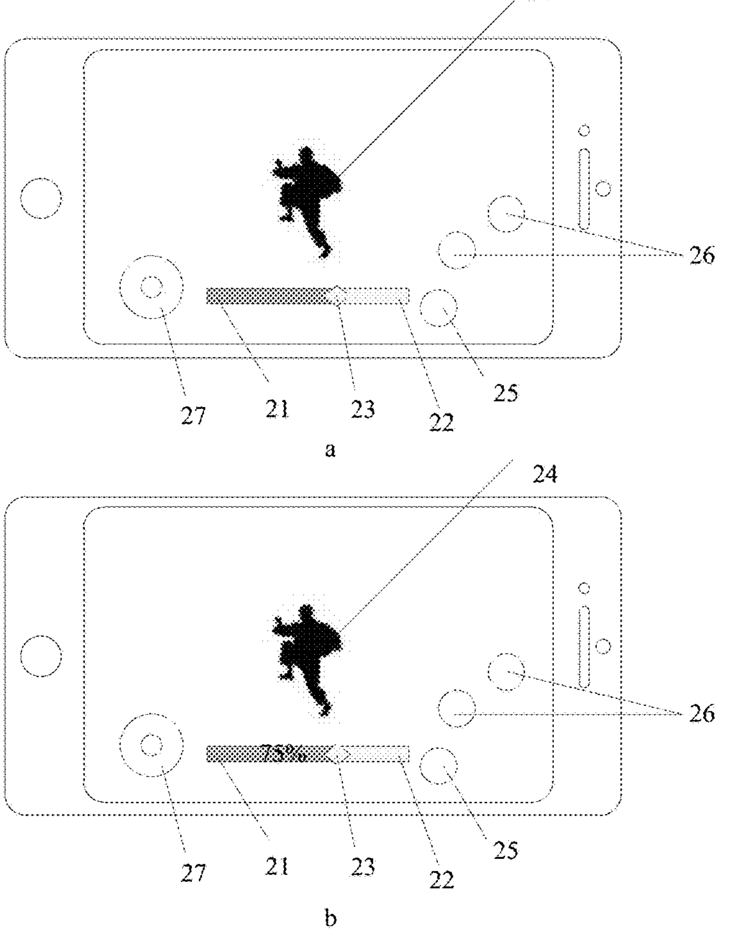
FIG. 2 shows a specific example of presenting a second target numerical value in an interaction controlling method provided by an embodiment of the present disclosure.

When the second target numerical value is presented in the form of a numerical value display control, the numerical value display control may include, for example: a first end, a second end, and a dynamic identifier located between the first end and the second end. The dynamic identifier may move between the first end and the second end with the update of the second target numerical value. The special effect material of the numerical value display control may be designed according to actual needs. For example, each time the second target numerical value is increased, the dynamic identifier is controlled to move to a second position after the increase from a first position before the increase. In addition, different colors may be configured to different second target numerical values, for example, a small second target numerical value may be configured with blue, green or other cold color; as the second target numerical value increases continuously, the color will gradually change to red and other warm color. In the example shown in FIG. 2, the numerical value display control is presented in the form of a progress bar. In this example, the progress bar comprises a first end 21, a second end 22, and a dynamic identifier 23 located between the first end 21 and the second end 22; 24 represents a virtual object; 25 represents a first button; 26 represents a second button; and 27 represents a joystick.

In addition, the numerical value display control may further be presented in combination of text. In the example shown in b of FIG. 2, where, in addition to including the numerical value display control presented in the form of a progress bar, the second target numerical value in the form of a percentage is further marked above the progress bar.

Figure 3:
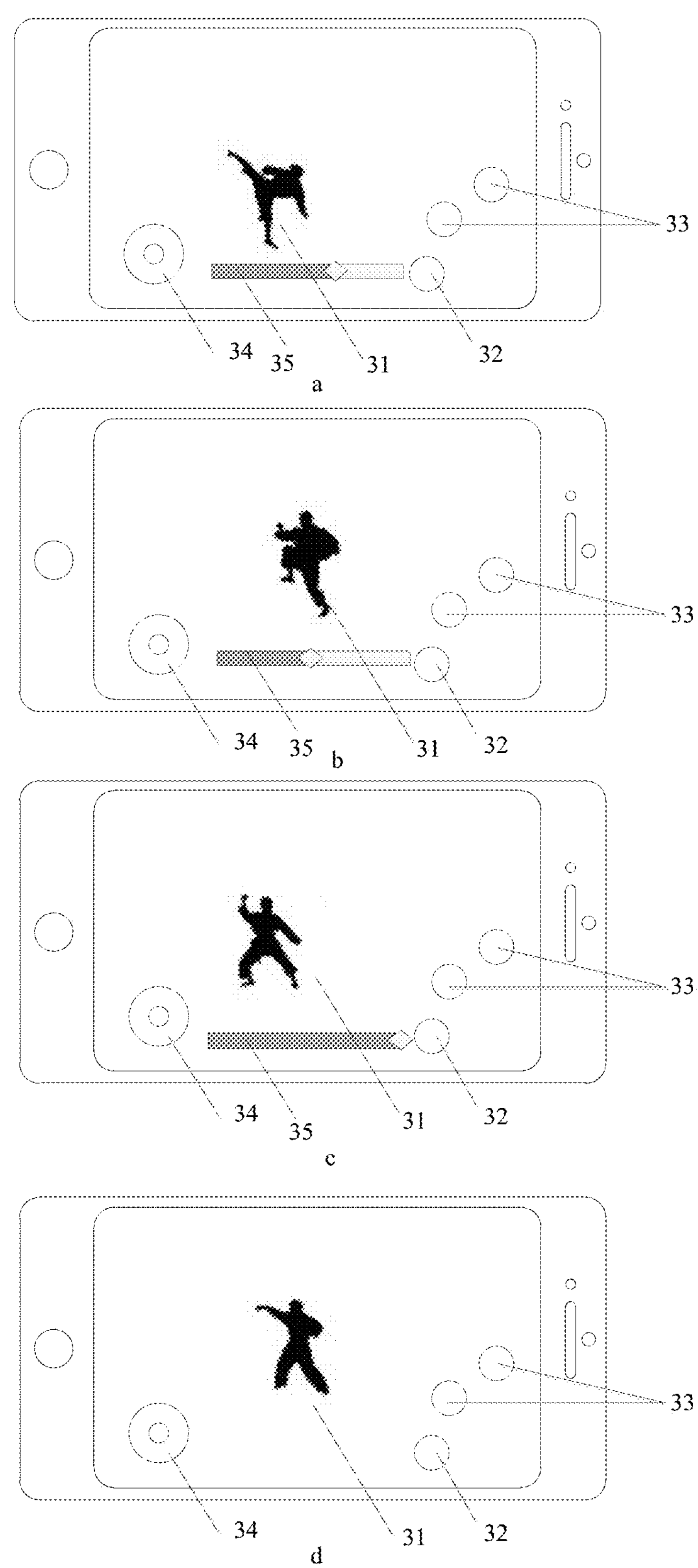
FIG. 3 shows a specific example of the content presented after a first button is triggered for a plurality of times in an interaction controlling method provided by an embodiment of the present disclosure.

As shown in FIG. 3, the target skill comprises 4 sub-skills, and in response to releasing the 4 sub-skills, a virtual object 31 performs different attack actions separately. 32 represents a first button, 33 represents a second button; 34 represents a joystick for controlling the virtual object 31 to move; wherein the game operating interface includes 3 buttons, and a first button is as represented by 32. In response to the first button 32 is triggered for the first time, the presented attack action is as shown in a of FIG. 3; When the first button 32 is triggered for the second time, the presented attack action is as shown in b of FIG. 3; when the first button 32 is triggered for the third time, the presented attack action is as shown in c of FIG. 3; when the first button 32 is triggered for the fourth time, the presented attack action is as shown in d of FIG. 3.

In the example corresponding to FIG. 3, in response to the first button is triggered for the first, second and third time, a numerical value display control 35 corresponding to the second target numerical value is presented respectively.

In a further embodiment of the present disclosure, the specific way of releasing a non-final sub-skill and triggering the display of the second target numerical value when the sub-skill corresponding to the first trigger operation is the non-final sub-skill in the N sub-skills may be as below, for example: in response to a first trigger operation on the first button, if a sub-skill corresponding to the first trigger operation is a non-final sub-skill in the plurality of sub-skills, releasing the non-final sub-skill; and detecting whether a current first target numerical value is a second preset numerical value; if the current first target numerical value is not the second preset numerical value, then triggering the display of the second target numerical value.

Here, the second preset numerical value characterizes, for example, a minimum value that is available to the first target numerical value. For example, the second preset numerical value can be set to 0, i.e., to characterize that the required cool down time after the final sub-skill of the target skill is released as is 0 second.

If it is detected that the current first target numerical value is the minimum value that is available, then the display of the second target numerical value is not triggered, or even if the display of the second target numerical value is triggered, the first target numerical value will not be updated after the second target numerical value meets the preset condition.

B: in the case that the sub-skill corresponding to the first trigger operation is the final sub-skill in the plurality of sub-skills, then the final sub-skill is released, and based on the first target numerical value, the first button is controlled to enter an invalid state; when the first button is in the invalid state, the target skill may not be released to respond.

In the specific implementation, when the first button is in the invalid state, even if triggered by the player, the first button does not respond to the trigger of the player, until the cool down time of the target skill ends and the first button is reset to a valid state. At this point, the player triggers the first button, and in response to the trigger of the user, the first button releases a first sub-skill in the plurality of sub-skills; since the first sub-skill is a non-final sub-skill, the display of the second target numerical value will be triggered.

In the embodiments of the present disclosure, the first target numerical value is a dynamically updated numerical value. If each non-final sub-skill is triggered before the final sub-skill is released, then none of the displayed second target numerical values meets the preset condition, at which point the first target numerical value may be a first preset numerical value; wherein the first preset numerical value characterizes an original cool down time of the target skill.

If the preset condition is met by triggering other sub-skills before the final sub-skill is triggered, then the first target numerical value is a value updated after meeting the preset condition. The specific update process may be referred to the detailed description of S103, which is not repeated here.

In a further embodiment of the present disclosure, after the final sub-skill is released, the first target numerical value may further be reset to a first preset numerical value. Thus, the cool down time of the target skill is restored to the original cool down time. In the next release cycle for releasing the target skill, the cool down time of the target skill may still be updated by the method provided according to the embodiments of the present disclosure.

Regarding S102, in the specific implementation, the second trigger operation comprises, for example, a trigger operation on a second button other than the first button in the buttons presented in the game operating interface. The second button is used for triggering the first virtual object to release other skill than the target skill or triggering the first virtual object to perform certain actions, such as leap, dodge and the like, or triggering the first virtual object to use items in a package, etc.

As an example, the present disclosure may update the second target numerical value through the following embodiment: based on the second button triggered by the second trigger operation, determining a second numerical value corresponding to the second button; updating the second target numerical value based on the second numerical value corresponding to the second button.

Here, the second numerical value is, for example, an energy value which can be increased by the energy characterized by the second target numerical value. Different second buttons correspond to different second numerical values.

As an example, a second numerical value corresponding to a second button for skill release is higher than a second numerical value corresponding to a second button for other usage. Moreover, regarding second buttons for releasing different skills, corresponding second numerical values may also differ. For example, a second button for releasing a high-damage skill has a higher second numerical value than a second button for releasing a low-damage skill.

Moreover, even though the same second button is triggered, different results may be caused, and the corresponding second numerical values may also be different.

As an example, (1): in the case that the second button is used for triggering the first virtual object to release other skill than the target skill, if the skill belongs to AOE damage skills, the larger the number of second virtual objects being hit, the greater the corresponding second numerical value. Wherein the second virtual object is a virtual object different from the first virtual object. The second virtual object may belong to the same or different factions as/from the first virtual object. In the case that the first virtual object and the second virtual object belong to the same faction, the second skill may be used for increasing gain status and recovering hit points (HP) for the second virtual object.

(2): in the case that the second button is used for triggering the first virtual object to perform a certain action, the higher the timeliness of the action, the greater the corresponding second numerical value. For example, to trigger the dodge skill, the second numerical value corresponding to the dodge that avoids the attack of the second virtual object is greater than that of the dodge that fails to avoid the attack of the second virtual object.

(3): in the case that the second button is used for triggering the first virtual object to use items in the package, the items used are different, or the items play a different utility, the corresponding second numerical value is also different. For example, the items used are HP restoration portions. When the HP restoration portion is used, it will be thrown to a certain position and take effect in a certain area near that position; the gain status of HP restoration will be applied to all second virtual objects of the same faction located in that area, and the more the second virtual objects to which the HP restoration gain status is applied, the greater the corresponding second numerical value will be.

In response to a second trigger operation triggered by the player on the second button is detected, a second numerical value corresponding to the second trigger operation may be determined based on the second button and/or an operation result corresponding to triggering the second button, and the second target numerical value may be updated with the second numerical value.

As an example, the embodiments of the present disclosure provide a specific method of updating the second target numerical value based on a second trigger operation in response to the second trigger operation being detected, the method comprising: in response to a second trigger operation on the second button being detected, releasing a skill corresponding to the second trigger operation, wherein the skill is different from the target skill; in response to the skill hitting a second virtual object, updating the second target numerical value based on the second trigger operation.

In this way, the player is prevented from accumulating the energy value for updating the cool down time of the target skill by controlling the first virtual object to perform ineffective actions, the difficulty of the game is raised and the fun of the game is improved.

Regarding S103, the first target numerical value may be updated using either of the following, but not limited to, C and D:

C: in the case that the second target numerical value meets the preset condition, updating the first target numerical value as the second preset numerical value.

Here, the second preset numerical value may be set according to actual needs.

As an example, the second preset numerical value is set to 0 s. The target skill comprises 4 sub-skills s1~s4; after any sub-skill of s1~s3 is triggered and the corresponding second target numerical value meets the preset condition, then the cool down time of the target skill is set to 0 s.

D: in the case that the second target numerical value meets the preset condition, updating the first target numerical value based on a first numerical value corresponding to the second trigger operation.

For example, the second preset numerical value is set to 0 s; the original cool down time of the target skill is 15 s. The target skill comprises 4 sub-skills s1~s4. If any sub-skill of s1~s3 is triggered and the corresponding second target numerical value meets the preset condition, then the cool down time of the target skill is reduced by 5 s, i.e., the cool down time changes from 15 s to 10 s. If s1~s3 are triggered and two of the corresponding second target numerical values meet the preset condition, the cool down time of the target skill is reduced by 10 s, i.e., changes from 15 s to 5 s. If s1~s3 are triggered and all of the corresponding second target numerical values meet the preset condition, the cool down time of the target skill is reduced by 15 s, i.e., changes from 15 s to 0 s. In this way, a variety of methods of skill release may be configured.

The preset condition comprises, for example, at least one of the following a1~a4:

a1: the second target numerical value reaches a first preset numerical value threshold.

In this case, a first preset numerical value threshold may be set in advance. If the second target numerical value, while continuously increasing, reaches the first preset numerical value threshold, then it is determined that the second target numerical value reaches the preset condition.

At this point, for example, the first preset numerical value threshold is set to 100; when the second target numerical value is greater than or equal to 100, it is determined that the second target numerical value meets the preset condition. Then, the first target numerical value is updated.

Wherein there may be a plurality of first preset numerical value thresholds; the updated first target numerical values corresponding to the plurality of first preset numerical values may be different.

As an example, the first preset numerical value of the first target numerical value is 15 s; the first preset numerical value threshold is 100, 150 and 200 respectively; if the second target numerical value is greater than or equal to 100 but less than 150, the first target numerical value may be updated as 10 s; if the second target numerical value is greater than or equal to 150 but less than 200, the first target numerical value may be updated as 5 s; if the second target numerical value is greater than or equal to 200, the first target numerical value may be updated as 0 s.

a2: in the case that a percentage between the second target numerical value and a second preset numerical value threshold reaches a preset percentage.

In this case, according to different needs, the preset percentage may be, for example, set to at least one of: 50%, 75%, 100%, etc. For different preset percentages, the first target numerical value may be updated as different numerical values.

For example, the first preset numerical value of the first target numerical value is 15 s. If a percentage of the second target numerical value and the second preset numerical value threshold reaches 50% but is less than 75% is greater than or equal to 100 but less than 150, the first target numerical value may be updated as 10 s; if the second target numerical value is greater than or equal to 150 but less than 200, the first target numerical value may be updated as 5 s; if the second target numerical value is greater than or equal to 200, the first target numerical value may be updated as 0 s.

a3: the second target numerical value reaches the first preset numerical value threshold within a preset duration after the first trigger operation.

In this case, if the second target numerical value can reach the first preset numerical value threshold within a preset duration after the first trigger operation, it is considered that the second target numerical value meets the preset condition, and the update of the first target numerical value is triggered. If the second target numerical value fails to reach the first preset numerical value threshold within the preset duration after the first trigger operation, then the update of the first target numerical value will not be triggered. In this case, the display of the displayed second target numerical value can be canceled, or a special effect of failed energy accumulation can be displayed, characterizing that this accumulation of energy has failed, and the trigger of the first button fails to reduce the cool down time of the target skill.

Specifically, the setting method of the first preset numerical value threshold is similar to a1, which is not repeated here.

For example, the preset duration is 5 seconds, the first preset numerical value of the first target numerical value is 15 s, and the first preset numerical value threshold is 100. If within 5 seconds, the second target numerical value is accumulated to be greater than 100 through the second trigger operation on the second button, then the first target numerical value is updated from 15 s to 0 s.

For another example, the preset duration is 5 seconds, the first preset numerical value of the first target numerical value is 15 s, and the first preset numerical value threshold is 100, 150 and 200 respectively. If within 5 seconds, the second target numerical value is greater than or equal to 100 but less than 150 through the second trigger operation on the second button, then the first target numerical value is updated as 10 s. If within 5 seconds, the second target numerical value is greater than or equal to 150 but less than 200, the first target numerical value may be updated as 5 s. If within 5 seconds, the second target numerical value is greater than or equal to 200, the first target numerical value may be updated as 0 s.

a4: a percentage between the second target numerical value and a second preset numerical value threshold reaches a preset percentage within a preset duration after the first trigger operation.

This case is similar to a3 and a2, which is not repeated here.

In order to avoid resetting the cool down of the target skill to a lower cool down time for a plurality of release cycles of the target skill in a row and thus increasing the game difficulty, in a further embodiment of the present disclosure, after the first target numerical value is updated, the number of times for which a duration of the first button being in an invalid state is less than a first preset numerical value after the final sub-skill is continuously released may be recorded; based on the number of times, a preset duration corresponding to the next release cycle of the target skill is determined.

Here, the release cycle of the target skill refers to a release cycle that begins with the release of the first of a plurality of sub-skills and ends with the release of the final of a plurality of sub-skills.

Each time a release cycle ends, it is determined whether or not the cool down time of the target skill corresponding to the release cycle is less than a first preset numerical value (the original cool down time of the target skill). If yes, the number of times is increased by 1. If the cool down time is equal to the first preset numerical value, then the number of times is set to 0. Based on the number of times, a preset duration corresponding to the next release cycle of the target skill is determined. The preset duration is the preset duration in a3 and a4.

As the number of times accumulates, the preset duration gets increasingly short. Thus, the operation difficulty of reducing the cool down time of the target skill is gradually increased, the diversity of skill release is further improved, and the difficulty of the game as well as the fun are enhanced.

In a further embodiment, in response to the second target numerical value not reaching the preset condition and a third trigger operation on the first button being detected, the second target numerical value is reset to a third preset value.

Here, the second preset value is an original numerical value of the second target numerical value, which may be, for example, 0. After the first button is triggered through the first trigger operation and the second target numerical value is displayed, if the second target numerical value has not yet accumulated to meet the preset condition, the first button is triggered again, at which point the second target numerical value is reset, characterizing that the energy accumulation fails.

In this case, if the sub-skill corresponding to the third trigger operation is a non-final sub-skill in the plurality of sub-skills, the sub-skill corresponding to the third trigger operation is released, and the display of the reset second target numerical value is triggered.

Here, the display mode of the reset second target numerical value is similar to the display mode of the second target numerical value in S101, which is not repeated.

In response to the sub-skill corresponding to the third trigger operation being the final sub-skill in the plurality of sub-skills, the sub-skill corresponding to the third trigger operation is released, and based on the first target numerical value, the first button is controlled to enter an invalid state.

Here, the way of controlling the first button to enter the invalid state is similar to that of controlling the first button to enter the invalid state as described in the above embodiments, which is not repeated here.

In this way, the continuous update of the cool down state of the target skill is realized, so that the diversity of skill release is improved, and the fun and operation difficulty of the game are enhanced.

Those skilled in the art may understand that in the above specific implementations of the methods, the drafting order of various steps does not imply any limitation of the implementation process by implying a strict order of execution, and the specific execution order of the steps should be determined by their functions and possible internal logic.

Based on the same inventive concept, the embodiments of the present disclosure further provide an interaction controlling apparatus corresponding to the interaction controlling method. Since the principle of the apparatus solving the problem in the embodiments of the present disclosure is similar to that of the interaction controlling method described above, the implementation of the apparatus may be referred to that of the method, and repetitions are omitted here.

Figure 4:
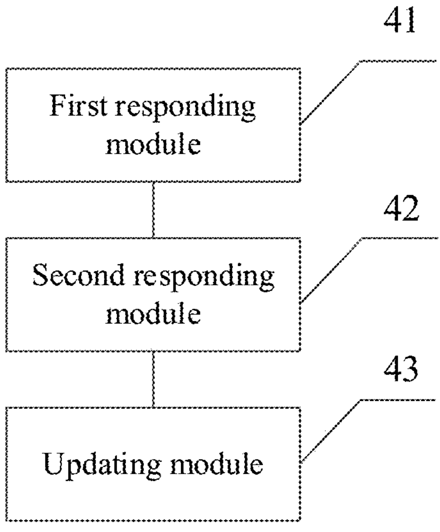
FIG. 4 shows a schematic diagram of an interaction controlling apparatus provided by an embodiment of the present disclosure.

With reference to FIG. 4, this figure shows a schematic diagram of an interaction controlling apparatus provided by the embodiments of the present disclosure. The interaction controlling apparatus is applied to a terminal device, in which a game operating interface is displayed. At least one virtual object and a plurality of buttons are presented in the game operating interface; the at least one virtual object comprises a first virtual object, the plurality of buttons comprising a first button. The first button is used for triggering the first virtual object to release a target skill, which comprises a plurality of sub-skills. Wherein by continuously triggering the first button, a plurality of sub-skills of the target skill can be sequentially released. The target skill is associated with a first target numerical value, which characterizes a duration that after a final sub-skill of the plurality of sub-skills is released and in the case of the first button being triggered, the target skill is not released to respond. The apparatus comprises:

a first responding module 41, configured to in response to a first trigger operation on the first button, release a sub-skill corresponding to the first trigger operation, and trigger a display of a second target numerical value;

a second responding module 42, configured to in response to a second trigger operation being detected, update the second target numerical value based on the second trigger operation, the second trigger operation being used for triggering a second button, the second button being a button different from the first button in the plurality of buttons;

an updating module 43, configured to in the case that the second target numerical value meets a preset condition, update the first target numerical value.

In a possible implementation, when, in response to the first trigger operation on the first button, release the sub-skill corresponding to the first trigger operation and triggering the display of the second target numerical value, the first responding module 41 is configured to:

in response to the first trigger operation on the first button, in the case of the sub-skill corresponding to the first trigger operation is a non-final sub-skill in the plurality of sub-skills, release the non-final sub-skill and triggering the display of the second target numerical value;

in the case that the sub-skill corresponding to the first trigger operation is the final sub-skill in the plurality of sub-skills, release the final sub-skill, and control the first button to enter an invalid state based on the first target numerical value, wherein the target skill is not released to respond in the case of the first button being in the invalid state.

In a possible implementation, after releasing the final sub-skill, the first responding module 41 is further configured to:

reset the first target numerical value to a first preset numerical value.

In a possible implementation, when, in response to the first trigger operation on the first button, in the case that the sub-skill corresponding to the first trigger operation is the non-final sub-skill in the plurality of sub-skills, releasing the non-final sub-skill and triggering the display of the second target numerical value, the first responding module 41 is configured to:

in response to the first trigger operation on the first button, in the case that the sub-skill corresponding to the first trigger operation is the non-final sub-skill in the plurality of sub-skills, release the non-final sub-skill; and detect whether a current first target numerical value is a second preset numerical value; in the case that the current first target numerical value is not the second preset numerical value, trigger the display of the second target numerical value.

In a possible implementation, when in the case that the second target numerical value meets the preset condition, updating the first target numerical value, the updating module 43 is configured to:

in the case that the second target numerical value meets the preset condition, update the first target numerical value to the second preset numerical value;

or, in the case that the second target numerical value meets the preset condition, update the first target numerical value based on a first numerical value corresponding to the second trigger operation.

In a possible implementation, when triggering the display of the second target numerical value, the first responding module 41 is configured to:

present a numerical value display control corresponding to the second target numerical value at a preset position of the game operating interface, the numerical value display control comprising a first end, a second end, and a dynamic identifier located between the first end and the second end.

In a possible implementation, after in response to the second trigger operation being detected, updating the second target numerical value based on the second trigger operation, the first responding module 41 is further configured to:

adjust a position of the dynamic identifier between the first end and the second end based on the updated second target numerical value.

In a possible implementation, when, in response to the second trigger operation being detected, updating the second target numerical value based on the second trigger operation, the second responding module 42 is configured to:

determine a second numerical value corresponding to the second button based on the second button triggered by the second trigger operation;

update the second target numerical value based on the second numerical value corresponding to the second button.

In a possible implementation, when, in response the second trigger operation being detected, updating the second target numerical value based on the second trigger operation, the second responding module 42 is configured to:

in response to the second trigger operation on the second button being detected, release a skill corresponding to the second trigger operation, wherein the skill is different from the target skill;

in response to the skill hitting a second virtual object, update the second target numerical value based on the second trigger operation.

In a possible implementation, the preset condition comprises at least one of the following:

the second target numerical value reaches a first preset numerical value threshold;

a percentage between the second target numerical value and a second preset numerical value threshold reaches a preset percentage;

the second target numerical value reaching the first preset numerical value threshold within a preset duration after the first trigger operation;

a percentage between the second target numerical value and the second preset numerical value threshold reaching a preset percentage within a preset duration after the first trigger operation.

In a possible implementation, after updating the first target numerical value, the updating module 43 is further configured to:

record a number of times that a duration of the first button being in an invalid state is less than a preset numerical value after the final sub-skill is continuously released;

determine a preset duration corresponding to the next release cycle of the target skill based on the number of times.

In a possible implementation, the second responding module 42 is further configured to: in response to the second target numerical value not meeting the preset condition and a third trigger operation on the first button being detected, reset the second target numerical value to a third preset value.

In a possible implementation, the first responding module 41 is further configured to: in response to a sub-skill corresponding to the third trigger operation being a non-final sub-skill in the plurality of sub-skills, release the sub-skill corresponding to the third trigger operation, and triggering a display of the reset second target numerical value;

in response to the sub-skill corresponding to the third trigger operation being a final sub-skill in the plurality of sub-skills, release the sub-skill corresponding to the third trigger operation, and controlling the first button to enter an invalid state based on the first target numerical value.

For the description of the processing flow of each module in the apparatus and the interaction flow between various modules, reference may be made to the relevant illustration in the above method embodiments, which is not detailed here.

Figure 5:
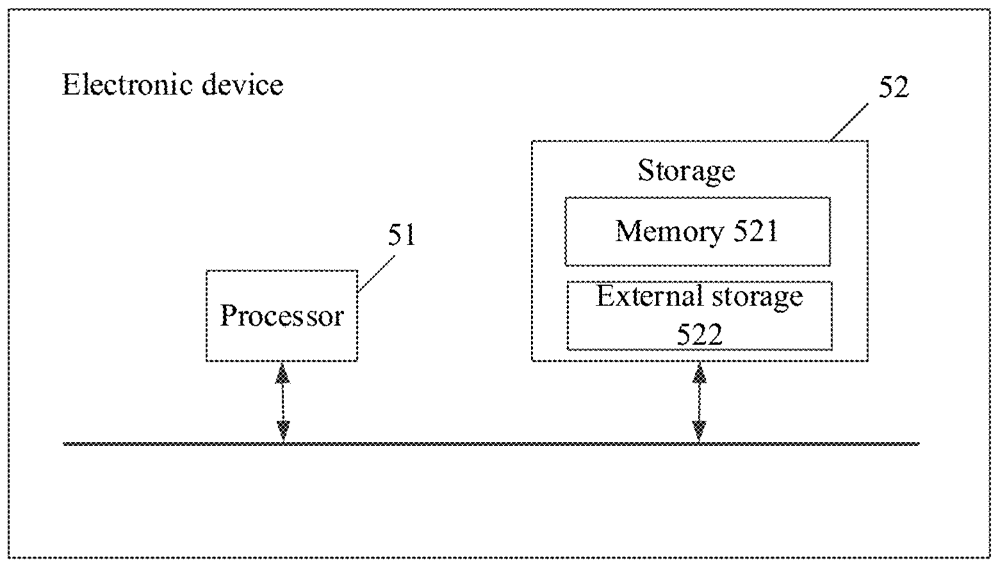
FIG. 5 shows a schematic diagram of an electronic device provided by an embodiment of the present disclosure.

The embodiments of the present disclosure further provide an electronic device. As shown in FIG. 5, this figure shows a structural schematic diagram of an electronic device provided by the embodiments of the present disclosure, comprising:

a processor 51 and a storage 52; the storage 52 storing the processor 51 executable machine-readable instructions, the processor 51 being used for executing the machine-readable instructions stored in the storage 52, the machine-readable instructions, when executed by the processor 51, causing the processor 51 to perform the following steps:

in response to a first trigger operation on the first button, releasing a sub-skill corresponding to the first trigger operation, and triggering a display of a second target numerical value;

in response to a second trigger operation being detected, updating the second target numerical value based on the second trigger operation, the second trigger operation being used for triggering a second button, the second button being a button different from the first button in the plurality of buttons;

in the case that the second target numerical value meets a preset condition, updating the first target numerical value.

The storage 52 comprises a memory 521 and an external storage 522; here the memory 521 is also referred to as an internal storage for temporarily storing operational data in the processor 51 and data exchanged with the external storage 522 such as a hard disk, the processor 51 exchanging data with the external storage 522 via the memory 521.

The specific execution process of the instructions may be referred to the steps of the interaction controlling method in the embodiments of the present disclosure, which is not detailed here.

The embodiments of the present disclosure further provide a non-transitory computer-readable storage medium, on which a computer program is stored, the computer program, when executed by a processor, performing steps of an interaction controlling method as described in the above method embodiments, wherein the storage medium may be a volatile or a non-volatile computer-readable storage medium.

The embodiments of the present disclosure further provide a computer program product, which carries program codes, instructions included in the program codes being used for performing steps of an interaction controlling method as described in the above method embodiments. For details, reference may be made to the above method embodiments, which is not detailed here.

The computer program product may be implemented as hardware, software or a combination thereof. In an optional embodiment, the computer program product is embodied as a computer storage medium. In a further optional embodiment, the computer program product is embodied as a software product, such as a software development kit (SDK), etc.

The embodiments of the present disclosure further provide a computer program, which, when executed by a processor, performs steps of an interaction controlling method as described in the above method embodiments.

It is apparent to those skilled in the art that for the convenience and brevity of the description, the above-described specific working process of the system and apparatus may be referred to the corresponding process in the method embodiments, which is not detailed herein. In the several embodiments provided by the present disclosure, it may be understood that the disclosed system, apparatus and method may be implemented in other way. The above-described apparatus embodiments are merely schematic. For example, the division of units is merely a logical function division, and there may have other division mode in practical implementation; for another example, a plurality of units or components may be combined or integrated into another system, or some features may be omitted or not performed. In addition, the mutual coupling, direct coupling or communication connection as shown or discussed may be indirect coupling or communication connection via some communication interfaces, apparatuses or units, may be electrical, mechanical or in other form.

The units illustrated as separate parts may be or not be physically separated, and components shown as units may be or not be physical units, i.e., may be located at the same place or distributed over a plurality of network units. A portion or all of units may be selected for achieving the objective of the solution of the embodiments according to actual needs.

In addition, various functional units in the various embodiments of the present disclosure may be integrated in one processing unit, individual units may separately and physically exist, or two or more units may be integrated in one unit.

The functionality, if implemented as software functional units and sold and used as independent products, may be stored a non-volatile computer-readable storage medium executable to a processor. Based on such an understanding, the essence of the technical solution of the present disclosure or the portion making contribution to the prior art or the portion of the technical solution may be embodied as a software product, which is stored in a storage medium and comprises several instructions for causing a computer device (which may be a personal computer, a server, a network device, etc.) to perform all or part of the steps of the method as described in the various embodiments of the present disclosure. The above-mentioned storage medium comprises: a U disk, a removable hard disk, a read-only memory (ROM), a random access memory (RAM), a magnetic diskette, an optical disc and other various media capable of storing program codes.

Finally, it is noteworthy that the above-described embodiments are merely specific implementations of the present disclosure for illustrating rather than limiting the technical solution of the present disclosure. The protection scope of the present disclosure is not limited to this. Although the present disclosure has been illustrated in detail with reference to the above embodiments, those of ordinary skill in the art should appreciate that any skilled in the art may make modifications to, readily conceive of changes to, or make equivalent replacements of the technical solution disclosed in the above embodiments; all these modifications, changes or replacements do not make the essence of the corresponding technical solution depart from the spirit and scope of the technical solution of the embodiments of the present disclosure but should be covered in the protection scope of the present disclosure. Therefore, the protection scope of the present disclosure should be defined by the claims.

What is claimed is:

1. An interaction controlling method, applied to a terminal device; wherein a game operating interface is displayed in the terminal device, the method comprising:

presenting, on the terminal device, at least one virtual object and a plurality of buttons, wherein the at least one virtual object comprises a first virtual object, and the plurality of buttons comprises a first button, the first button being used for triggering the first virtual object to release a target skill, the target skill comprising a plurality of sub-skills, wherein the target skill is associated with a first target numerical value, the first target numerical value characterizing a duration that after a final sub-skill of the plurality of sub-skills is released and when the first button is triggered, the target skill is not released to respond; the method comprises:

in response to a first trigger operation on the first button, releasing a sub-skill corresponding to the first trigger operation, and triggering a display of a second target numerical value;

in response to a second trigger operation being detected, updating the second target numerical value based on the second trigger operation, the second trigger operation being used for triggering a second button, the second button being a button different from the first button in the plurality of buttons;

when the second target numerical value meets a preset condition, updating the first target numerical value; and in response to continuously triggering the first button, sequentially releasing at least one subsequent sub-skill of the sub-skill among the plurality of sub-skills of the target skill including the final sub-skill.

2. The method according to claim 1, wherein in response to the first trigger operation on the first button, releasing the sub-skill corresponding to the first trigger operation and triggering the display of the second target numerical value comprises:

in response to the first trigger operation on the first button, in the case of the sub-skill corresponding to the first trigger operation is a non-final sub-skill in the plurality of sub-skills, releasing the non-final sub-skill and triggering the display of the second target numerical value; and in the case that the sub-skill corresponding to the first trigger operation is the final sub-skill in the plurality of sub-skills, releasing the final sub-skill, and controlling the first button to enter an invalid state based on the first target numerical value, wherein the target skill is not released to respond in the case of the first button being in the invalid state.

3. The method according to claim 2, wherein after releasing the final sub-skill, the method further comprises:

resetting the first target numerical value to a first preset numerical value.

4. The method according to claim 2, wherein in response to the first trigger operation on the first button, in the case that the sub-skill corresponding to the first trigger operation is the non-final sub-skill in the plurality of sub-skills, releasing the non-final sub-skill and triggering the display of the second target numerical value comprises:

in response to the first trigger operation on the first button, in the case that the sub-skill corresponding to the first trigger operation is the non-final sub-skill in the plurality of sub-skills, releasing the non-final sub-skill; and detecting whether a current first target numerical value is a second preset numerical value; and in the case that the current first target numerical value is not the second preset numerical value, triggering the display of the second target numerical value.

5. The method according to claim 4, wherein in the case that the second target numerical value meets the preset condition, updating the first target numerical value comprises:

in the case that the second target numerical value meets the preset condition, updating the first target numerical value to the second preset numerical value; or in the case that the second target numerical value meets the preset condition, updating the first target numerical value based on a first numerical value corresponding to the second trigger operation.

6. The method according to any of claim 1, wherein triggering the display of the second target numerical value comprises:

presenting a numerical value display control corresponding to the second target numerical value at a preset position of the game operating interface, the numerical value display control comprising a first end, a second end, and a dynamic identifier located between the first end and the second end.

7. The method according to claim 6, wherein after in response to the second trigger operation being detected, updating the second target numerical value based on the second trigger operation, the method further comprises:

adjusting a position of the dynamic identifier between the first end and the second end based on the updated second target numerical value.

8. The method according to claim 1, wherein in response to the second trigger operation being detected, updating the second target numerical value based on the second trigger operation comprises:

determining a second numerical value corresponding to the second button based on the second button triggered by the second trigger operation; and updating the second target numerical value based on the second numerical value corresponding to the second button.

9. The method according to claim 1, wherein in response the second trigger operation being detected, updating the second target numerical value based on the second trigger operation comprises:

in response to the second trigger operation on the second button being detected, releasing a skill corresponding to the second trigger operation, wherein the skill is different from the target skill; and in response to the skill hitting a second virtual object, updating the second target numerical value based on the second trigger operation.

10. The method according to claim 1, wherein the preset condition comprises at least one of:

the second target numerical value reaching a first preset numerical value threshold;

a percentage between the second target numerical value and a second preset numerical value threshold reaching a preset percentage;

the second target numerical value reaching the first preset numerical value threshold within a preset duration after the first trigger operation; and a percentage between the second target numerical value and the second preset numerical value threshold reaching a preset percentage within a preset duration after the first trigger operation.

11. The method according to claim 10, wherein after updating the first target numerical value, the method further comprises:

recording a number of times that a duration of the first button being in an invalid state is less than a preset numerical value after the final sub-skill is continuously released; and determining a preset duration corresponding to the next release cycle of the target skill based on the number of times.

12. The method according to claim 1, wherein the method further comprises: in response to the second target numerical value not meeting the preset condition and a third trigger operation on the first button being detected, resetting the second target numerical value to a third preset value.

13. The method according to claim 12, wherein the method further comprises:

in response to a sub-skill corresponding to the third trigger operation being a non-final sub-skill in the plurality of sub-skills, releasing the sub-skill corresponding to the third trigger operation, and triggering a display of the reset second target numerical value; and in response to the sub-skill corresponding to the third trigger operation being a final sub-skill in the plurality of sub-skills, releasing the sub-skill corresponding to the third trigger operation, and controlling the first button to enter an invalid state based on the first target numerical value.

14. An electronic device, comprising: a processor, a memory and a bus, the memory storing machine-readable instructions executable by the processor, when the electronic device runs, the processor and the memory communicating via the bus, the machine-readable instructions, when executed by the processor, causing the processor to:

cause a game operating interface to display in the electronic device; at least one virtual object and a plurality of buttons are presented in the game operating interface, the at least one virtual object comprises a first virtual object, and the plurality of buttons comprises the first button, the first button being used for triggering the first virtual object to release a target skill, the target skill comprising a plurality of sub-skills, wherein the plurality of sub-skills of the target skill being sequentially released by continuously triggering the first button, the target skill is associated with a first target numerical value, the first target numerical value characterizing a duration that after a final sub-skill of the plurality of sub-skills is released and in the case of the first button being triggered, the target skill is not released to respond;

in response to a first trigger operation on the first button, release a sub-skill corresponding to the first trigger operation, and triggering a display of a second target numerical value;

in response to a second trigger operation being detected, update the second target numerical value based on the second trigger operation, the second trigger operation being used for triggering a second button, the second button being a button different from the first button in the plurality of buttons;

when the second target numerical value meets a preset condition, update the first target numerical value; and in response to continuously triggering the first button, sequentially release at least one subsequent sub-skill of the sub-skill among the plurality of sub-skills of the target skill including the final sub-skill.

15. The device according to claim 14, wherein the instructions to, in response to the first trigger operation on the first button, release the sub-skill corresponding to the first trigger operation and triggering the display of the second target numerical value comprises instructions causing the processor to:

in response to the first trigger operation on the first button, in the case of the sub-skill corresponding to the first trigger operation is a non-final sub-skill in the plurality of sub-skills, release the non-final sub-skill and triggering the display of the second target numerical value; and in the case that the sub-skill corresponding to the first trigger operation is the final sub-skill in the plurality of sub-skills, release the final sub-skill, and control the first button to enter an invalid state based on the first target numerical value, wherein the target skill is not released to respond in the case of the first button being in the invalid state.

16. The device according to claim 15, wherein the memory further stores instructions causing the processor to: after releasing the final sub-skill, reset the first target numerical value to a first preset numerical value.

17. The device according to claim 15, wherein the instructions to, in response to the first trigger operation on the first button, in the case that the sub-skill corresponding to the first trigger operation is the non-final sub-skill in the plurality of sub-skills, release the non-final sub-skill and triggering the display of the second target numerical value comprises instructions causing the processor to:

in response to the first trigger operation on the first button, in the case that the sub-skill corresponding to the first trigger operation is the non-final sub-skill in the plurality of sub-skills, releasing the non-final sub-skill; and detecting whether a current first target numerical value is a second preset numerical value; and in the case that the current first target numerical value is not the second preset numerical value, triggering the display of the second target numerical value.

18. The device according to claim 17, wherein the instructions to, in the case that the second target numerical value meets the preset condition, update the first target numerical value comprises instructions causing the processor to:

in the case that the second target numerical value meets the preset condition, update the first target numerical value to the second preset numerical value; or in the case that the second target numerical value meets the preset condition, update the first target numerical value based on a first numerical value corresponding to the second trigger operation.

19. The device according to any of claim 14, wherein the instructions to trigger the display of the second target numerical value comprises instructions causing the processor to:

present a numerical value display control corresponding to the second target numerical value at a preset position of the game operating interface, the numerical value display control comprising a first end, a second end, and a dynamic identifier located between the first end and the second end.

20. A non-transitory computer-readable storage medium, wherein a computer program is stored on the computer-readable storage medium, the computer program, when executed by a processor, causing the processor to:

cause a game operating interface to display in the electronic device; at least one virtual object and a plurality of buttons are presented in the game operating interface, the at least one virtual object comprises a first virtual object, and the plurality of buttons comprises the first button, the first button being used for triggering the first virtual object to release a target skill, the target skill comprising a plurality of sub-skills, wherein the plurality of sub-skills of the target skill being sequentially released by continuously triggering the first button, the target skill is associated with a first target numerical value, the first target numerical value characterizing a duration that after a final sub-skill of the plurality of sub-skills is released and in the case of the first button being triggered, the target skill is not released to respond;

in response to a first trigger operation on the first button, release a sub-skill corresponding to the first trigger operation, and triggering a display of a second target numerical value;

in response to a second trigger operation being detected, update the second target numerical value based on the second trigger operation, the second trigger operation being used for triggering a second button, the second button being a button different from the first button in the plurality of buttons;

when the second target numerical value meets a preset condition, update the first target numerical value; and in response to continuously triggering the first button, sequentially release at least one subsequent sub-skill of the sub-skill among the plurality of sub-skills of the target skill including the final sub-skill.

* * * * *